March 1, 1966 R. W. HATCH, JR 3,237,857
AERIFORM FLUID INFORMATION TRANSFER DEVICE
Filed June 24, 1964
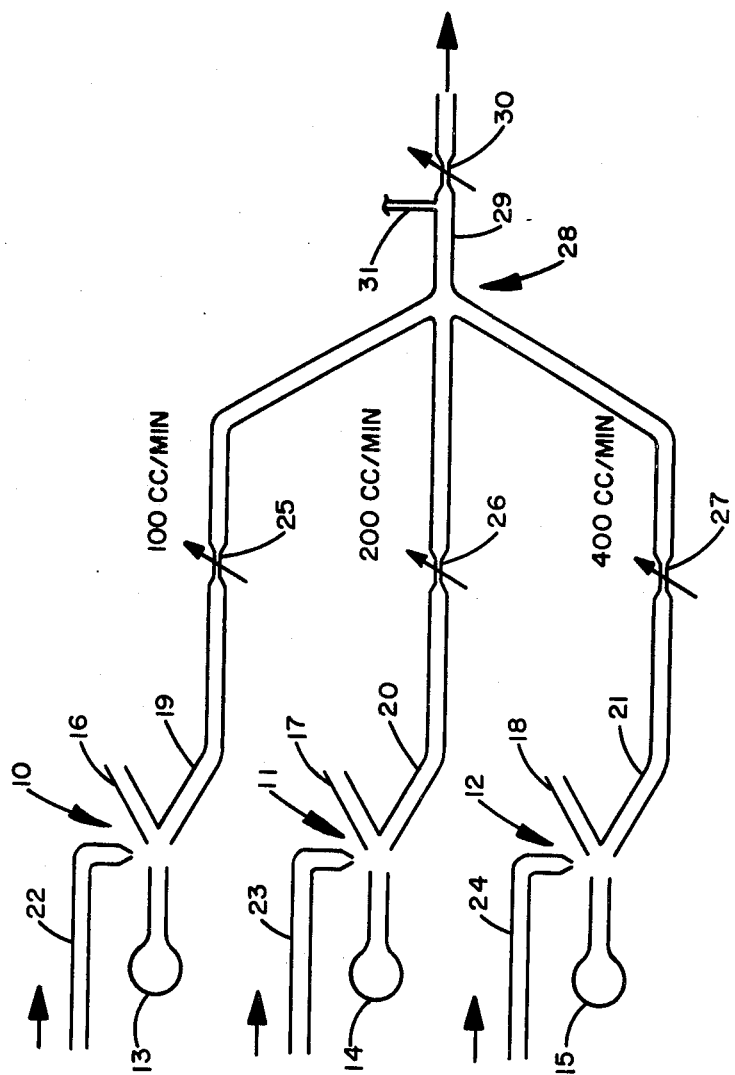
INVENTOR.
RICHARD W. HATCH, JR.
BY
Lawrence H. Poelon
AGENT

United States Patent Office 3,237,857
Patented Mar. 1, 1966

3,237,857
AERIFORM FLUID INFORMATION
TRANSFER DEVICE
Richard W. Hatch, Jr., Norwell, Mass., assignor to The
Foxboro Company, Foxboro, Mass., a corporation of
Massachusetts
Filed June 24, 1964, Ser. No. 377,547
1 Claim. (Cl. 235—201)

This invention relates to systems utilizing compressible fluids such as gas, air, vapor, and the like.

It is concerned with means for isolating fluid signals in a system having flowing streams therethrough, wherein the upstream signals are not disturbed by the downstream fluid situation.

This is a dynamic fluid device on a continuous flow basis.

This is accomplished in this invention by using flow restrictors in critical flow situations (see the magazine The Petroleum Engineer, March 1947, page 214). This is a matter of establishing, with respect to a restrictor, a downstream pressure which is one-half or less of the upstream pressure, the flow becomes sonic in the restrictor and sub-sonic downstream. On this basis the flow measurement is a function only of the restrictor size and the upstream pressure. In ordinary considerations, for example, an orifice place restrictor, in flow measurement, differential pressure is a controlling factor and involves a square route function.

Accordingly, in this invention, a fluid logic signal upstream, which flows through a restrictor on a critical flow basis, will not be disturbed upstream by pressure variance of possible feedbacks from downstream action. This can be important and critical in some signal operations, especially in the fluid logic field.

A particular application of this invention is in the matter of supplying a digital to analog converter based on a critical flow situation.

In this application digital input signals are applied to fluid logic flip-flop units with outputs from different units established on a binary logic basis of flow capacity in the coding of 1, 2, 4, and if desirable 8, 16, etc., with the outputs from these critical flow restrictors later downstream joined to a single output in a summation or adding of the actual flows to provide an analog representation of the digital inputs.

It is an object of this invention to provide a new and useful aeriform fluid information transfer system.

Other objects and advantages of this invention will be in part apparent and in part pointed out hereinafter and in the accompanying drawing, wherein:

The drawing is a schematic illustration of a specific embodiment of a digital to analog converter according to this invention, including isolation means in the form of critical flow restrictor situations.

Referring to the drawing, there is provided in parallel arrangement, three fluid logic flip-flop units 10, 11 and 12. Each of these flip-flop units is provided with a power source as at 13, 14 and 15 and a pair of output passages. One of these is a vent at 16, 17 and 18, and the other is a working output passage as at 19, 20 and 21. Each flip-flop unit has an input control signals passage as at 22, 23 and 24.

There may be more or fewer of these fluid logic units in parallel, as desired.

The working output passages of the flip-flop units are provided with restrictors, which may be variable, as at 25, 26 and 27. These restrictors are adjusted on a binary code basis, for example, restrictor 25 may be arranged to pass 100 cc.'s of gas per minute, restrictor 26 may be established to pass 200 cc.'s of gas per minute, and restrictor 27, 400 cc.'s of gas per minute in the binary code system of 1, 2, 4, 8, 16, and so forth.

The output passages beyond the restrictors 25, 26 and 27 are joined into a single passage at a juncture 28, to continue in a single output passage 29, through a variable restrictor 30 to vent to atmosphere, or to a pressure sink at a desired level according to the particular application. Just upstream of the restrictor 30 there is a pressure take-off passage 31 wherein an analog signal in representation of the digital input signals may be taken off.

The input passages 22, 23, and 24 are supplied with digital pulses according to a prior signal combination.

The output passage restrictors 25, 26 and 27 are s-tablished as critical flow situations. With respect to the size of the restrictor and the volume of flow, therethrough, there arrives a situation, in increasing flow, wherein the downstream pressure of the restrictor is one-half or less of the upstream pressure. In this situation flow measurement is a function only of the restrictor size and the upstream pressure.

This critical flow situation enables the digital operation of fluid logic flip-flops upstream of the restrictors 25, 26 and 27 without interference from downstream pressures which might introduce errors therein.

The critical flow situation of the restrictors' combination of size and sufficient flow thereinto, produces a form of aeriform fluid information transfer system which may be compared to a check valve, a one way cascading system, or something of the nature of a rectifier, wherein flow is passed through but information and effect is one way, that is from left to right in the drawing in the flow direction of the system.

This device, as in the figure, provides a digital to analog converter system based on critical flow situations wherein a series of digital pulses may be applied to the input through the flip-flop units and in terms of the binary situation of the output of the flip-flop units, the proper flow for the proper flip-flop units is applied to the output and summed in a single juncture 28 into an analog total, representative of the digital total, in a simple, compact system with no moving parts.

The output from the passage 31 has an analog signal which is linear with differential pressure across the resistor restrictor 30 as long as the output therefrom is to a stable atmospheric or other pressure. This provides a linear output in the passage 31 for application directly to a valve, to valve relay, or to other suitable intermediate system.

This invention thus provides a new and useful aeriform fluid information transfer system.

As many embodiments may be made of the above invention, and as changes may be made in the embodiments set forth above without departing from the scope of the invention, it is to be understood that all matter hereinbefore set forth or shown in the accompanying drawing is to be interpreted as illustrative only and not in a limiting sense.

I claim:

A dynamic, continuous flow, fluid logic compressible fluid operated digital to analog converter system with no moving parts and based on aeriform compressible fluid critical flow situations in multiple flow lines each across a single simple restrictor in each of said lines, said converter system comprising, in combination, a parallel arrangement of a plurality of fluid logic flip-flop units, power source means individual to each of said flip-flop units to provide individually sufficient flow for said critical flow situation in each of said flow lines, each of said flip-flop units comprising an operating output and a vent output, a control input to each of said flip-flop units for applying digital control pulses thereto, a variable flow restrictor in each of said working outputs, said restrictors each comprising means whereby flow in each line is treated only by being first restricted from line size and then expanded to line size, said restrictors being related to each other on a binary code basis in terms of the individual critical flow situation of each, a juncture of said output passages downstream of said restrictors, a single output passage from said juncture, a restrictor in said single output passage, and a pressure take-off passage from said output passage between said juncture and said output restrictor, said output passage, downstream of said last named restrictor, being open to vent to an essentially constant pressure sink, such as atmosphere.

References Cited by the Examiner

UNITED STATES PATENTS

| | | | |
|---|---|---|---|
| 3,068,880 | 12/1962 | Riordan | 235—201 |
| 3,081,942 | 3/1963 | Maclay | 235—201 |
| 3,088,664 | 5/1963 | Oglesby et al. | 235—201 |
| 3,122,165 | 2/1964 | Horton | 235—201 |
| 3,156,157 | 11/1964 | Smith et al. | 235—201 |

FOREIGN PATENTS 111,405  4/1964  Czechoslovakia.

LEO SMILOW, *Primary Examiner.*

LEYLAND M. MARTIN, W. F. BAUER,
*Assistant Examiners.*